(12) United States Patent
Bach et al.

(10) Patent No.: US 7,625,433 B2
(45) Date of Patent: Dec. 1, 2009

(54) METHOD FOR CLEANING A PARTICLE FILTER

(76) Inventors: Bastian Bach, Wildsteig 10b, 42113 Wuppertal (DE); Achim Dittler, Fred-Uhlman-Strasse 9, 70619 Stuttgart (DE); Michael Himmen, Steinkuhle 8, 58730 Frondenberg (DE); Bernd Krutzsch, Eichendorffstrasse 8, 73770 Denkendorf (DE); Peter Neumann, Pater-Alker-Weg 18, 58706 Menden (DE); Eberhard Schmidt, Böhler Weg 12a, 42285 Wuppertal (DE); Jost-Peter Sonnenberg, Gockinghofstrasse 51, 58332 Schwelm (DE); Gunter Wenninger, Alte Dorfstrasse 36a, 70599 Stuttgart (DE)

( * ) Notice: Subject to any disclaimer, the term of this patent is extended or adjusted under 35 U.S.C. 154(b) by 428 days.

(21) Appl. No.: 10/557,954

(22) PCT Filed: May 7, 2004

(86) PCT No.: PCT/EP2004/004865
§ 371 (c)(1),
(2), (4) Date: Aug. 21, 2006

(87) PCT Pub. No.: WO2004/104387
PCT Pub. Date: Dec. 2, 2004

(65) Prior Publication Data
US 2007/0175183 A1    Aug. 2, 2007

(30) Foreign Application Priority Data
May 24, 2003    (DE)    ............... 103 23 735

(51) Int. Cl.
*B01D 46/00*    (2006.01)

(52) U.S. Cl. .......... 95/278; 55/282.3; 55/523; 55/DIG. 10; 55/DIG. 30; 422/177

(58) Field of Classification Search ................ 55/282.3, 55/282.2, 282, 286, 523, DIG. 10, DIG. 30; 422/177; 60/311; 95/278
See application file for complete search history.

(56) References Cited

U.S. PATENT DOCUMENTS 4,938,787 A * 7/1990 Simmerlein-Erlbacher ... 96/298

(Continued)

FOREIGN PATENT DOCUMENTS

DE    4041127 C2    2/1992

(Continued)

OTHER PUBLICATIONS

Search report for German priority application 10323735.6 dated Dec. 8, 2003.

(Continued)

*Primary Examiner*—Robert J Hill, Jr.
*Assistant Examiner*—Karla Hawkins

(57) ABSTRACT

The invention relates to a method for cleaning a particle filter (1) with the following method steps: a gaseous stream laden with pollutants and/or particles is fed to a particle filter (1) that operates catalytically and/or by filtration, pollutants and/or particles are chemically converted or stored in the particle filter (1), filtrate or ash particles (2) being produced and/or deposited on the particle filter (1). Once the particle filter (1) has been used for a specific period of time, a layer (3, 4) for increasing the through-flow resistance is applied to the layer of filtrate or ash particles (2) in the direction of filtration.

9 Claims, 1 Drawing Sheet

U.S. PATENT DOCUMENTS

| | | | |
|---|---|---|---|
| 5,445,745 A | 8/1995 | Handtmann | |
| 2002/0077452 A1* | 6/2002 | Braun et al. | 528/480 |

FOREIGN PATENT DOCUMENTS

| | | |
|---|---|---|
| DE | 4313132 C2 | 10/1994 |
| DE | 19924130 A1 | 12/2000 |
| DE | 10148180 A1 | 4/2003 |
| EP | 0341832 B1 | 1/1996 |
| EP | 0930422 A1 | 7/1999 |
| JP | 07068218 A | 3/1995 |

OTHER PUBLICATIONS

PCT form ISA/210 and PCT/ISA/237 from corresponding PCT application, May 24, 2003.

* cited by examiner

METHOD FOR CLEANING A PARTICLE FILTER

CROSS REFERENCE APPLICATIONS

This application is a national stage application of PCT application no. PCT/EP2004/004865 filed on May 7, 2004 and claiming priority from German application 103 23 735.6 filed on May 24, 2003.

BACKGROUND

In many chemical engineering processes the deposition of particles from gaseous streams laden with pollutants and/or particles to either obtain a product or reduce emissions is a major step in the process. Particle filters are consequently used in many areas, in particular for removing particulates from the exhaust gas of internal combustion engines. In exhaust emission control systems, particularly for diesel engines, the particle filter is used to filter out most of the particles, mostly particulates, from the exhaust gas of the engine. The particulates accumulate on the particle filter, which causes its flow resistance to increase over time and impedes proper operation of the engine.

During operation of the engine, small amounts of the lubricating oil are inevitably burned together with the fuel. The oil additives that are usually added to the lubricating oil form non-combustible particulate compounds in the exhaust gas and accumulate on the particle filter as ash, which also contributes to the increase in the flow resistance of the particle filter over time.

A method which reverses or avoids the increase in the particle filter flow resistance caused by the accumulation of particulates is proposed in European Patent EP 0 341 832 B1. In this continuously operating method, the particulates deposited on the particle filter are oxidized or burned with the aid of the nitrogen dioxide present in the exhaust gas.

In addition to this continuous method, other methods of burning off particulates for the discontinuous regeneration of clogged particle filters are known. In these methods, special measures can be used to heat up the temperature of the exhaust gas from time to time to temperatures in excess of 550° C. while maintaining an oxidizing composition, which leads to the burning off of the particulates.

Since during normal operation of diesel engines, exhaust gas temperatures in excess of 500° C. are rarely reached, it is also known to use a fuel additive which lowers the particulate burn-off temperature. One example of this is disclosed in patent DE 40 41 127 C2. After the combustion process in the combustion chamber of the engine, the effective constituents of the fuel additive are still found in particle form in the exhaust gas and are deposited on the particle filter. The additive deposits have catalytic properties and cause a lowering of the particulate burn-off temperature. Therefore the flow resistance of the particle filter clog with particulates can be temporarily reduced again by using the regeneration or particulate burn-off processes mentioned.

Nevertheless, during the operating time of the particle filter, its flow resistance inevitably increases to undesirably high values as the ash particles that also accumulate on the particle filter cannot be removed by these particulate burn-off processes. It is therefore often recommended to remove the particle filter from the exhaust emission control system and replace it after a certain running time of the motor vehicle. To avoid this laborious measure, an operating method for a particle filter in which it is freed of ash by flushing with a liquid in a flushing process is proposed in the patent DE 43 13 132 C2. However, the ash usually forms a deposit that firmly adheres to the particle filter, making this flushing process difficult to carry out and often incomplete.

The present method provides a new method for operating a particle filter, in particular a particle filter of an internal combustion engine of a motor vehicle, with which ash particles can be removed effectively.

With particle deposition on surface filters a layer of filtrate or ash particles that increases as the process progresses forms on the surface of the filter medium. This layer is known as a dust cake or filter cake. This layer causes the pressure loss to increase with increasing filtration time. To maintain a commercially viable filtration operation, the layer of filtrate or ash particles must be periodically removed from the surface of the filter medium.

Many methods are known for the removal of the layer. As already mentioned, these include the thermal burn-off of a layer of particulates from the surface of the diesel particle filter and the back flushing of the filter with a fluid by flow reversal or by pressure surge regeneration. If the layer of filtrate or ash particles is to be removed by introducing flow forces, the force of adhesion of the layer of filtrate or ash particles must be overcome by the applied flow forces at the interface of the filter medium and the layer of filtrate or ash particles. A major contributory factor to the flow forces here is the through-flow resistance of the layer of filtrate or ash particles itself. Particle filters that are subjected to a layer of filtrate or ash particles generally have high pressure losses during the previous filtration step. Furthermore, if the forces of adhesion with respect to the filter medium are very high, layers of particles with low through flow resistance are only inadequately detached from the surface of the filter medium.

With the method according to the present disclosure, this disadvantage is to be overcome, so that the layer of filtrate or ash particles deposited on a filter medium can be largely or completely detached by flow forces.

The foregoing example of the related art and limitations related therewith are intended to be illustrative and not exclusive. Other limitations of the related art will become apparent to those of skill in the art upon a reading of the specification and a study of the drawings.

SUMMARY

In the method according to the present disclosure a layer for increasing the through-flow resistance is applied to the layer of filtrate or ash particles in the direction of filtration after the particle filter has been in use with forces of adhesion occurring between the layer for increasing the through-flow resistance and the layer of filtrate or ash particles.

The layer for increasing the through-flow resistance may consist of solid particles with at least 50 percent of the solid particles of this layer being smaller than the average diameter of the filtrate or ash particles. The through-flow resistance of the layer of filtrate or ash particles is advantageously increased by applying a layer of finely dispersed particles. The solid particles may be produced in situ in the medium to be filtered by adding the solid particles to the fluid to be filtered at the end of the actual filtration process and/or applied to the particle filter laden with ash or filtrate at the end of the filtration process by a sedimentation process.

The through-flow resistance of the layer of filtrate or ash particles can also be advantageously increased by spraying the surface of the layer of filtrate or ash particles with a liquid medium (for example adhesive, lacquer, dispersion) or solution (for example sodium chloride in water) or by allowing it to be flowed through or subjected to the vapor phase of a liquid (for example water).

Furthermore, according to the disclosure, the layer for increasing the through-flow resistance may be consolidated, increasing the through-flow resistance, by briefly increasing the rate of flow acting on the filter before the regeneration of the particle filter. The increase in the rate of flow, from for example 5 cm/s to 20 cm/s, can be achieved by a pressure surge from the laden gas side or a relaxation on the clean gas side.

In a further refinement of the method according to the disclosure, the layer for increasing the through-flow resistance is made virtually impenetrable to flow or impermeable by supplying energy in the form of convection, radiation and/or contact heat. This causes the through-flow resistance to be further increased and the detachment of the layer of filtrate or ash particles by a flushing process counter to the direction of filtration is further improved.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present method in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
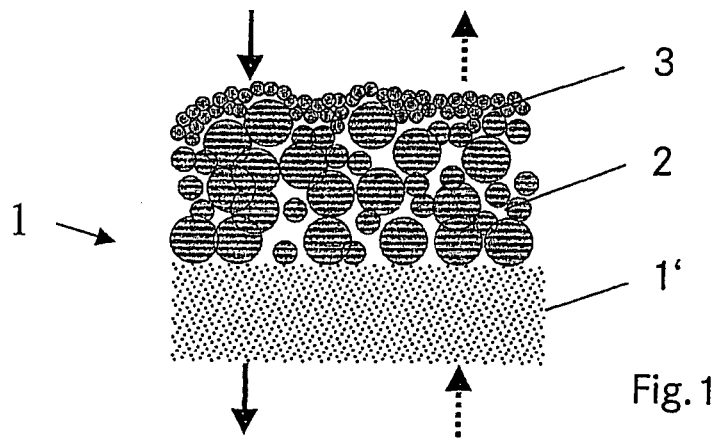
FIG. 1 is schematic view of a detail of a particle filter with a layer of finely dispersed particles for increasing the through-flow resistance on a layer of filtrate or ash particles.

The particle filter 1 shown in FIG. 1 has a filter medium 1'. During the process of the particle deposition a layer of filtrate or ash particles 2 increases on the filter medium 1' as the process progresses. As a result of this increasing layer, the pressure loss increases with increasing filtration time, therefore the layer must be periodically removed. For this purpose a layer 3 for increasing the through-flow resistance is applied to the layer of filtrate or ash particles 2 in the direction of filtration after the particle filter has been in use. This is referred to as post-coating. The application of this finely dispersed layer 3 may take place toward the end of the actual filtration process, in which particles of solid matter, for example $TiO_2$, are fed at a metered rate into the fluid to be filtered. During the filtering process, the solid particles are allowed to settle on the surface of the layer of filtrate or ash particles 2 as they flow through the particle filter.

Furthermore, the layer 3 may also be applied by in-situ production of solid matter at the end of the filtration. As an example, the gas phase reaction to form solid $NH_4NO_3$ is one example: $NH_3$ is added in a metered manner, at a specific molar ratio, to $NO_x$ present in the stream of exhaust gas. The educts react in a gas phase reaction initiated by radiation at temperatures around 70 to 90° C. to form solid $NH_4NO_3$, which is deposited on the layer of filtrate or ash particles 2 as a layer 3 for increasing the through-flow resistance.

Furthermore, the layer 3 can also be applied after the filtering process by a sedimentation or settling process. The particles settle after a certain time on the layer of filtrate or ash particles 2. The particles can be in a fluid, a gas or a liquid. The layer of particles 3 applied in this way can also penetrate into the uppermost regions of the layer of filtrate or ash particles 2 in the range of a few μm, without penetrating the entire layer 2. The adhesive effect between layer 2 and layer 3 is increased in this way.

Figure 2:
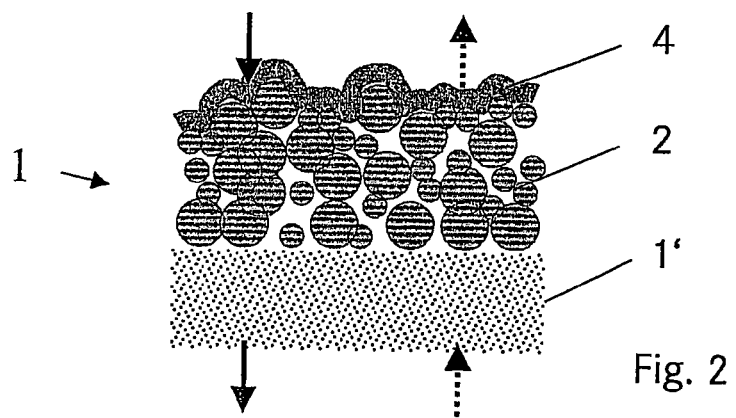
FIG. 2 is a schematic view of a detail of a particle filter with a fluid film located on a layer of filtrate or ash particles.

As represented in FIG. 2 it is also possible to apply a fluid film 4 to the layer of filtrate or ash particles 2 which envelops the surface of the layer 2 by forming a film to increase the through-flow resistance. This can occur by spraying the layer of filtrate or ash particles 2 with a liquid medium, such as adhesive, lacquer or dispersion, or a solution, such as sodium hydroxide in water, or by allowing the vapor phase of a liquid, such as water, to flow through the layer 2.

By spraying the layer of filtrate or ash particles 2 with a liquid, and the associated adsorption of this liquid on the layer of filtrate or ash particles 2, the capillary condensation of the vapor and/or the crystallization of the dissolved salt, the pores of this layer of filtrate or ash particles 2 are made smaller or closed by the fluid film forming. As a result, in the detachment of the layer of filtrate or ash particles 2 by introducing flow forces counter to the direction of filtration, the pressure loss of this layer can be significantly increased. The layer 3 applied in this way can also penetrate into the uppermost regions of the layer of filtrate or ash particles 2 in the range of several μm without making the entire layer 2 stick and in this way increasing the adhesive effect between layer 2 and layer 3.

Both in the exemplary embodiment according to FIG. 1 and in the example according to FIG. 2, the through flow resistance can be further increased by supplying energy in the form of convection, radiation and/or contact heat to the layers. The layer 3 applied as a layer of finely dispersed particles or as a fluid film being made virtually impenetrable to flow or impermeable by supplying energy in this way.

The layer of finely dispersed particles of solid matter described in FIG. 1 may be applied to the layer of filtrate or ash particles 2 as wax or polyethylene particles. Other substances suitable for the respective intended use that do not undergo any chemical reaction with the layer of filtrate or ash particles 2 to be covered could be used as well. The particle filter 1 or the applied layer 3 is subsequently heated by supplying energy to the extent that it softens or melts. On cooling, a virtually impermeable layer is produced by closure of the pores. The layer thickness may be about 1 to 10 micrometers. Depending on the application and the material used, the layer thickness of this layer of particles may also be chosen to be larger or smaller. The adhesion between the particles of the layer 3 and the adhesion between layer 3 and the upper regions of the layer 2 is increased in this way. The blockage of the pores also has the effect of significantly increasing the flow resistance and, consequently, advantageously leading to a lasting improvement in the detachment of the layer during regeneration.

The fluid film described in FIG. 2 may also be warmed or heated by supplying energy, such as by convection, radiation or contact heat, to increase the through-flow resistance. Furthermore, the applied fluid film can also be consolidated by irradiation with UV light, microwaves or the like or by treatment with ultrasound. Another example is the application of a solvent-containing adhesive, in which case a layer that is virtually impenetrable to flow is produced by driving out the solvent.

Additionally, the application of a polymerizable substance or polymerizable mixture, which is induced to set, crosslink or cure by supplying heat and/or UV light could be applied. After completion of the chemical reaction a layer that is virtually impenetrable to flow is obtained, likewise significantly increasing the through-flow resistance. Possible examples of polymerizable substances or polymerizable mixtures included acrylates, methacrylic resins, epoxy resins or other substances suitable for the intended use that do not undergo any chemical reaction with the layer of filtrate or ash particles 2 to be covered.

A possible polymerizable substance includes urethane acrylate, which as a UV- and light-curing product can be cross linked/cured in a few seconds. The wavelength range necessary for the cross linking/curing in the UV range preferably lies in the range from approximately 320 to approximately 400 nm; the light-curing wavelength range is preferably in the range from approximately 400 to approximately 500 nm. The layer thickness of said fluid film may lie in a range from approximately 3 to 30 nm. However, as also in the previously mentioned example, depending on the application and material used, the layer thickness for a fluid film may also be chosen to be larger or smaller.

The one-component, solvent-free system may also be provided with a second curing system, which makes combination curing possible. This can be used in obscured, poorly accessible regions, in which curing exclusively by UV is not possible. Depending on the application, 3 different types of combination curing are available: anaerobic, thermal or chemical. The UV irradiation always takes place first, followed by the respective combination curing. The freedom from solvent means that such a system advantageously has good environmental compatibility.

Figure 3:
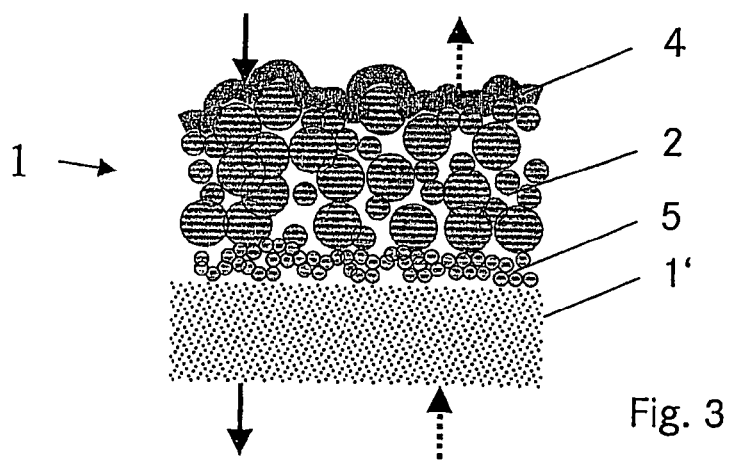
FIG. 3 shows a detail of a particle filter with a combination of pre-coating and post-coating of a particle filter.

FIG. 3 shows a particle filter 1 with an adhesion-reducing release layer 5 applied to the surface of the filter substrate 1', a layer of filtrate or ash particles 2 located on it and a layer for increasing the through-flow resistance 4 covering the surface of the layer 2. The method is used with preference for the filtering of diesel exhaust gases. Before the particle filter 1 is used, an adhesion-reducing release layer 5 is applied to the surface of the particle filter 1 on the flow-facing side. This is referred to as a pre-coating.

The filter surface may be subjected to application of the layer 5 by a variety of techniques, for example by allowing a substance to settle from a solution or suspension or by the spray method with the aid of an aerosol. The release layer 5 is porous, in order that the exhaust gases can flow through the layer 5 into the substrate material of the particle filter 1. The porosity of the release layer 5 is kept such that the openings contained therein are smaller in diameter than the non-combustible ash particles produced in particulate burn-off, so that they do not pass through the release layer 5. The release layer 5 has the effect of reducing the binding forces between the ash and the substrate surface of the particle filter 1 in comparison with the binding forces that would occur if the ash layer were to adhere directly to the surface of the particle filter 1. The forces of adhesion of the ash particles with respect to layers 4 and 5 are so great that the build up of layers 2, 4, 5 is readily detached from the particle filter by the use of a fluid with the aid of a counter current fluid technique. Liquid or gaseous phases may be used as the fluid for flushing. The particle filter 1 may also be removed from the place it is used, for example the exhaust pipe, in the canned state and freed of the ash deposits in corresponding cleaning baths.

In all the figures, the direction of flow of the gaseous stream or stream of exhaust gas, i.e. the direction of filtration, is identified by a continuous arrow; the broken arrows indicate the direction of flow of the cleaning stream or the flushing.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true sprit and scope. Each apparatus embodiment described herein has numerous equivalents.

We claim:

1. A method for cleaning a particle filter comprising:
feeding in a direction of filtration a gaseous stream laden with at least one of pollutants and particles to a particle filter that operates by at least one of a catalytic process and a filtration process and that comprises a filter medium;
chemically converting or storing at least one of pollutants or particles in the particle filter such that a dust cake is deposited on the particle filter;
wherein once the particle filter has been used for a specific period of time, applying a layer for increasing the through-flow resistance to the dust cake upstream of the filter medium in the direction of filtration;
supplying energy in the form of at least one of convection, radiation or contact heat so as to make the layer for increasing the through-flow resistance virtually impenetrable to flow or impermeable;
and carrying out a flushing process in a direction counter to the direction of filtration to detach filtrate or ash particles of the dust cake.

2. The method as claimed in claim 1, further comprising briefly increasing the rate of flow acting on the filter to compact the layer for increasing through-flow resistance.

3. The method as claimed in claim 1, wherein the material of the layer (4) for increasing the through-flow resistance comprises a fluid film.

4. The method as claimed in claim 3, wherein applying the fluid film to the particle filter laden with ash or filtrate comprises at least one of spraying or flowing through.

5. The method as claimed in claim 3, further comprising briefly increasing the rate of flow acting on the filter to compact the layer for increasing through-flow resistance.

6. The method as claimed in claim 1, wherein the material of the layer for increasing the through-flow resistance comprises solid particles, at least 50 percent of the solid particles being smaller than the average diameter of filtrate or ash particles of the dust cake.

7. The method as claimed in claim 6, further comprising briefly increasing the rate of flow acting on the filter to compact the layer for increasing through-flow resistance.

8. The method as claimed in claim 6, wherein applying the layer for increasing through-flow resistance comprises one of: applying the solid particles to the particle filter laden with ash or filtrate by in situ production in the filter medium to be filtered, and by applying the solid particles to the particle filter laden with ash or filtrate by a sedimentation process.

9. The method as claimed in claim 8, further comprising briefly increasing the rate of flow acting on the filter to compact the layer for increasing through-flow resistance.

* * * * *